(12) United States Patent
Duarte et al.

(10) Patent No.: US 7,107,084 B2
(45) Date of Patent: Sep. 12, 2006

(54) SLIDING DISPLAY APPARATUS

(75) Inventors: Matias Duarte, San Francisco, CA (US); Joseph Palmer, San Jose, CA (US)

(73) Assignee: Danger, Inc., Palo Alto, CA (US)

( * ) Notice: Subject to any disclaimer, the term of this patent is extended or adjusted under 35 U.S.C. 154(b) by 412 days.

(21) Appl. No.: 10/232,127

(22) Filed: Aug. 29, 2002

(65) Prior Publication Data

US 2003/0109230 A1    Jun. 12, 2003

Related U.S. Application Data

(60) Provisional application No. 60/315,971, filed on Aug. 29, 2001.

(51) Int. Cl.
  *H04B 1/38*    (2006.01)
(52) U.S. Cl. .............. 455/575.3; 455/575.4; 379/433.12; 379/433.13
(58) Field of Classification Search ............ 455/550.1, 455/575.1, 575.3, 575.4, 347, 351; 379/433.01, 379/433.04, 433.12, 433.13; 361/679, 680, 361/681
See application file for complete search history.

(56) References Cited

U.S. PATENT DOCUMENTS

| | | | |
|---|---|---|---|
| 4,237,540 A | | 12/1980 | Sato |
| 4,718,740 A | | 1/1988 | Cox |
| 5,168,426 A | * | 12/1992 | Hoving et al. ............ 361/681 |
| 5,224,060 A | | 6/1993 | Ma |
| 5,268,817 A | | 12/1993 | Miyagawa et al. |
| 5,278,779 A | | 1/1994 | Conway et al. |
| 5,345,362 A | | 9/1994 | Winkler |
| 5,510,806 A | * | 4/1996 | Busch ..................... 345/87 |
| 5,548,478 A | * | 8/1996 | Kumar et al. ............ 361/681 |
| 5,628,817 A | | 5/1997 | Fugleberg et al. |
| 5,638,257 A | | 6/1997 | Kumar et al. |
| 5,900,848 A | | 5/1999 | Haneda et al. |
| 5,949,408 A | | 9/1999 | Kang et al. |
| 6,020,878 A | | 2/2000 | Robinson |
| 6,108,716 A | | 8/2000 | Kumura et al. |
| 6,129,237 A | * | 10/2000 | Miyahara .................. 220/812 |

(Continued)

FOREIGN PATENT DOCUMENTS

EP    1 009 104 A2 *   6/2000

(Continued)

OTHER PUBLICATIONS

Brandenbert, et al., "Physical Configuration Of A Handheld Electronic Communication Device", Provisional Application Filed Dec. 20, 1999, U.S. Appl. No. 60/172,675.

*Primary Examiner*—Nguyen T. Vo
(74) *Attorney, Agent, or Firm*—Blakely, Sokoloff, Taylor & Zafman, LLP

(57) ABSTRACT

A sliding display apparatus is described. The apparatus includes a base and a cover. The cover substantially covers the base in a closed position. A first edge of the cover is slideably coupled to the base and the cover is also coupled to the base by one or more links. Each of the links have a first pivot in a first axis and a second pivot in a second axis. The first axis, the second axis and the first edge of the cover are substantially parallel. The first axis is located in the base, the second axis is located in the cover. The first pivot can also include a tensioner that applies tension to the first pivot of each one of the links.

21 Claims, 10 Drawing Sheets

U.S. PATENT DOCUMENTS

| | | |
|---|---|---|
| 6,134,103 A | 10/2000 | Ghanma |
| 6,157,717 A * | 12/2000 | Chintala et al. ....... 379/433.13 |
| 6,191,938 B1 | 2/2001 | Ohgami et al. |
| 6,433,777 B1 | 8/2002 | Sawyer |
| 6,446,004 B1 | 9/2002 | Cao et al. |
| 6,482,445 B1 | 11/2002 | England |
| 6,507,336 B1 | 1/2003 | Lunsford |
| 6,525,715 B1 | 2/2003 | Uchiyama et al. |
| 6,539,208 B1 * | 3/2003 | Mori ....................... 455/575.3 |
| 6,542,721 B1 * | 4/2003 | Boesen .................. 455/553.1 |
| 6,618,044 B1 | 9/2003 | Gettemy et al. |
| 6,622,031 B1 | 9/2003 | McCleary et al. |
| 6,636,419 B1 * | 10/2003 | Duarte ........................ 361/680 |
| 6,665,173 B1 | 12/2003 | Brandenberg et al. |
| 6,836,404 B1 * | 12/2004 | Duarte ........................ 361/680 |
| 2002/0075281 A1 | 6/2002 | Suzuki et al. |
| 2004/0062000 A1 | 4/2004 | Duarte |

FOREIGN PATENT DOCUMENTS

| | | |
|---|---|---|
| JP | 06-324759 | 11/1994 |
| JP | 10-055227 | 2/1998 |
| JP | 11-161367 | 6/1999 |

* cited by examiner

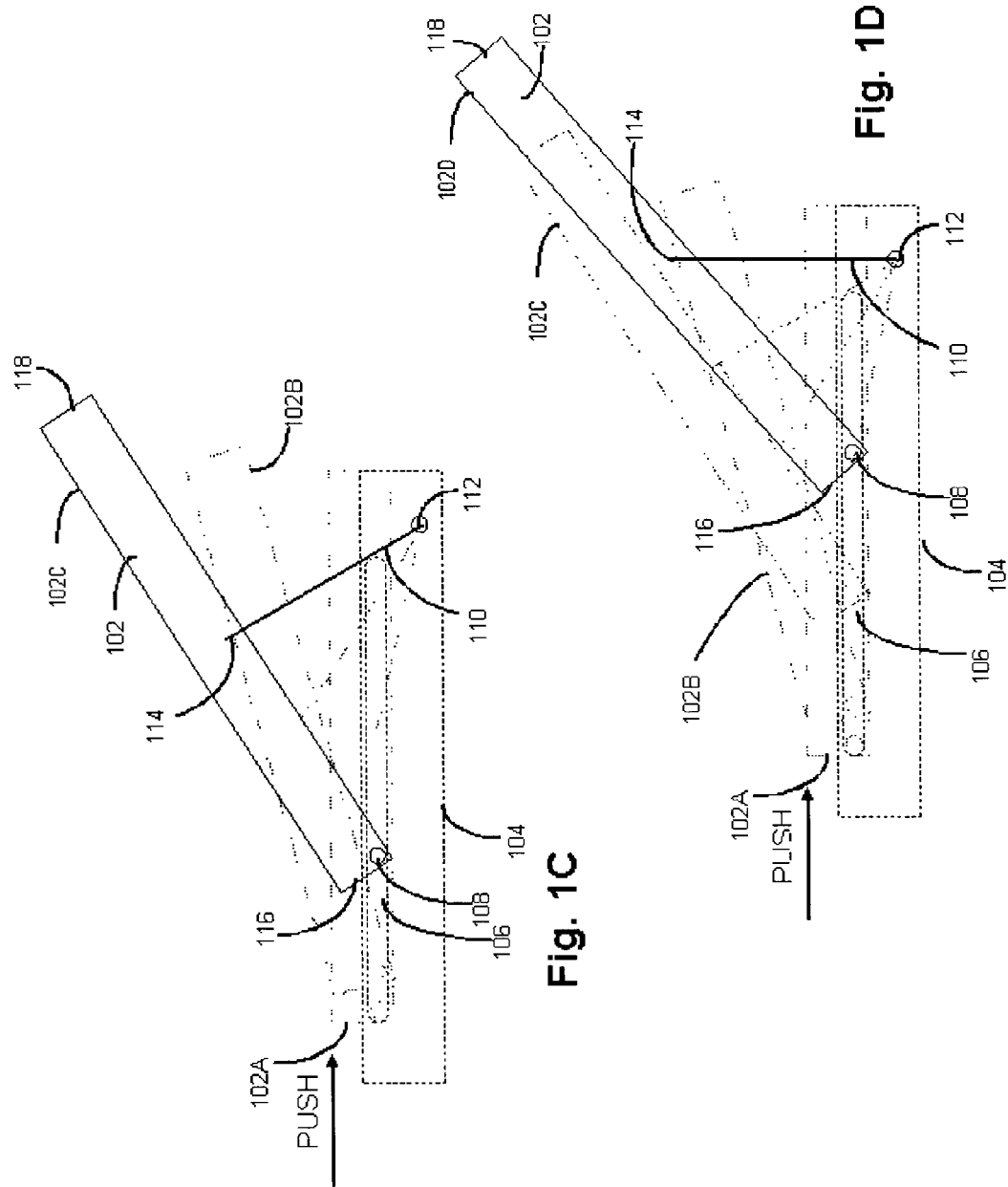

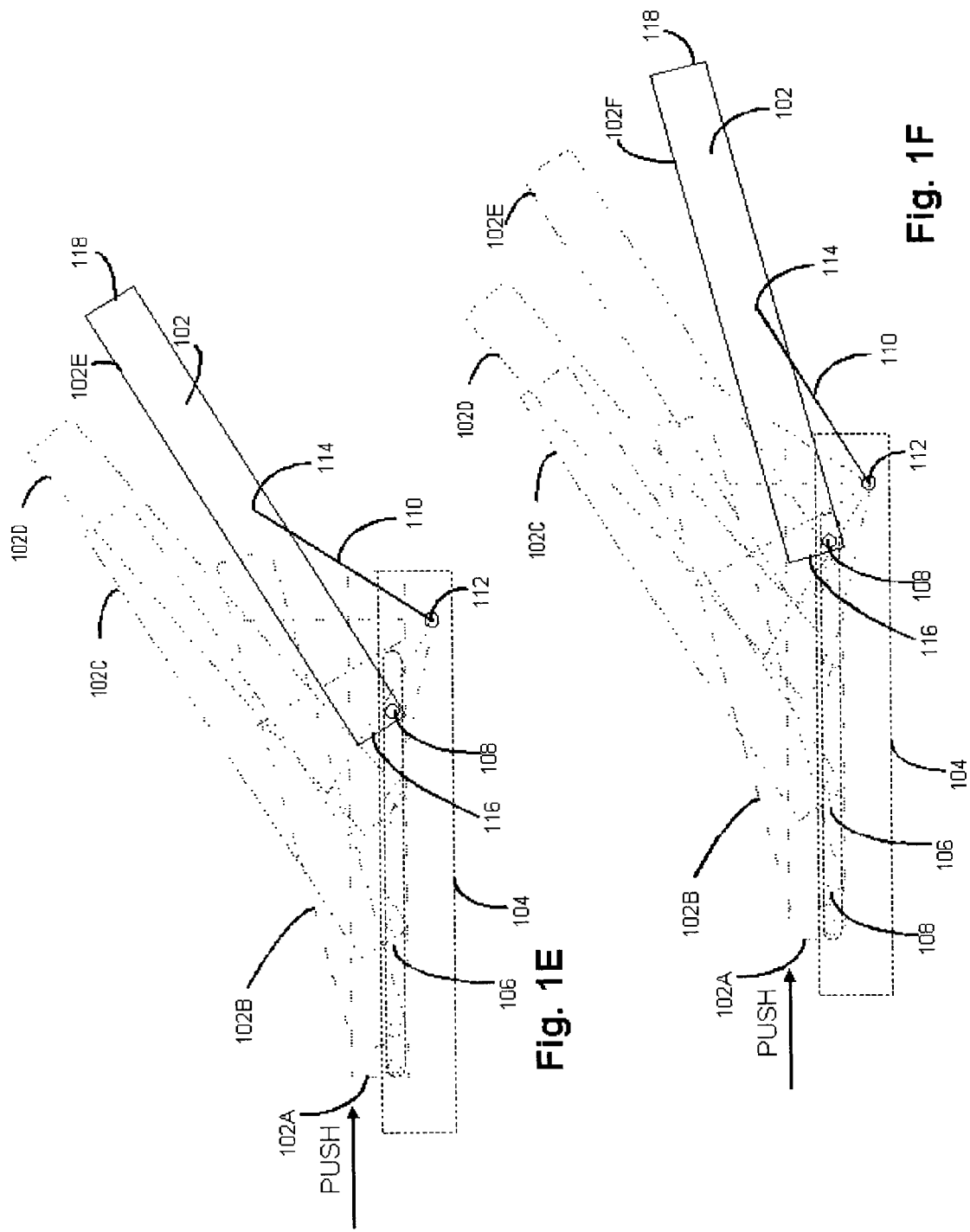

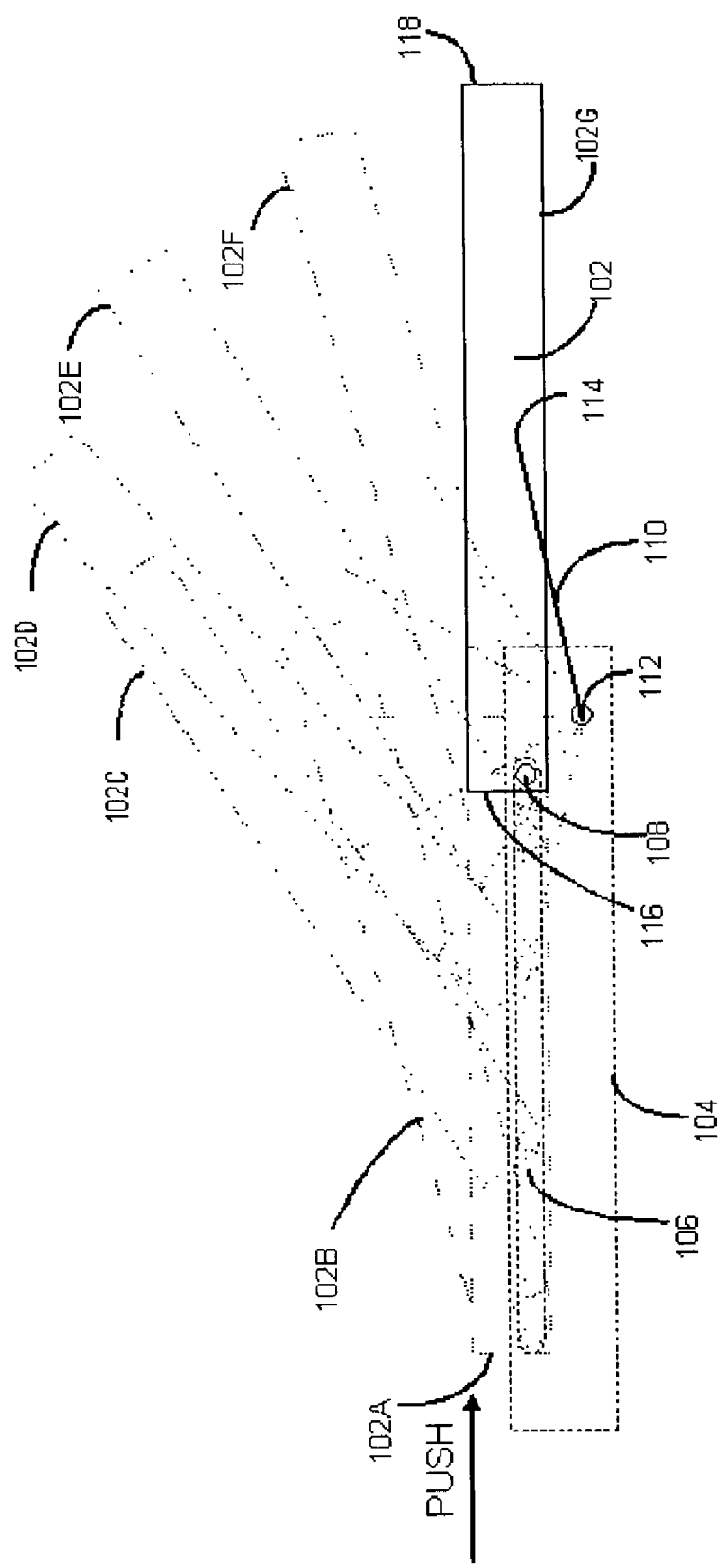

SLIDING DISPLAY APPARATUS

The present application claims priority from a U.S. provisional application entitled "A Sliding Display Apparatus", Application No. 60/315,971, filed Aug. 29, 2001.

FIELD OF THE INVENTION

This invention relates to display systems in more particularly to a system and method of opening and closing a display.

BACKGROUND OF THE INVENTION

Handheld electronic devices include many types of devices such as cellular telephones, test equipment, pagers, and handheld computing devices. Each of these types of handheld electronic devices includes a user interface of a display and some type of a data entry device such as a keyboard. Often the user interface for a handheld electronic device also includes knobs, wheels, joysticks and other types of user input devices. Handheld computing devices typically require the most complicated user interfaces so that the users have many features and options of use of the handheld computing device. Because the user interface on a handheld computing device is typically the most complicated, then the handheld computing device is used as an example to describe various user interfaces. However, as described herein, the various embodiments of user interfaces could also be applied to other types of electronic devices, not limited to only those types of devices described above.

Handheld computing devices must be small. A handheld computing device requires a user-friendly interface. In various approaches to manufacturing handheld computing devices, the user interface has been compromised in one manner or another to reduce the physical size. Often the size reductions include combining multiple functions in each input device such as multiple function keys on an abbreviated keyboard.

In one approach, such as a PalmPilot from Palm Computing, Inc, a separate keyboard is eliminated and a touch screen interface is used. In another approach, a cellular telephone-type user interface is used. The cellular telephone-type user interface has a small display and an abbreviated keyboard that is typically a slightly enhanced, 10-key numeric keypad. In still another approach, such as a Hewlett Packard, Jornada 700 Series Handheld PC, a full QUERTY keyboard is included but the display is folded or closed over the keyboard. Covering the keyboard with the display decreases the physical size of the handheld PC but also removes the display from the view of the user and blocks the user from access to the keyboard.

What is needed is a handheld computing device that has a larger display and a larger keyboard than a cellular telephone-type interface and where the display is visible at all times.

SUMMARY OF THE INVENTION

A sliding display apparatus is described. The apparatus includes a base and a cover. The cover substantially covers the base in a closed position. A first edge of the cover is slideably coupled to the base and the cover is also coupled to the base by one or more links. Each of the links have a first pivot in a first axis and a second pivot in a second axis. The first axis, the second axis and the first edge of the cover are substantially parallel. The first pivot can also include a tensioner that applies tension to the first pivot of each one of the links.

In one embodiment, a client computing device can be included in the base and the cover.

BRIEF DESCRIPTION OF THE DRAWINGS

The present invention is illustrated by way of example and not limitation in the figures of the accompanying drawings in which like references indicate similar elements.

FIG. 1C illustrates the display pushed further rearward.

FIG. 1D shows the rear end of the display raised as the display pushed further rearward.

FIG. 1E shows the display pressed further rearward past a center position.

FIG. 1F shows the rear end of the display lowering as the display is pushed beyond the center position.

FIG. 1G shows the display is in a full open position.

DETAILED DESCRIPTION

As will be described in more detail below, a system and method of opening and closing a cover is disclosed. FIGS. 1A–1G show a sequence of opening a cover from a closed position to an open position. In at least one embodiment, the cover can include a display.

Figure 1A:
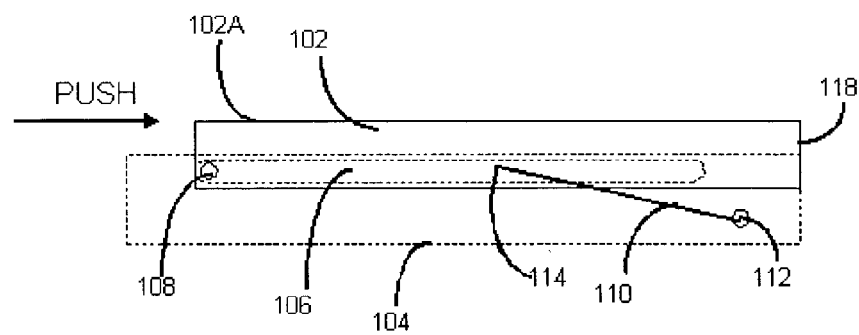
FIG. 1A, illustrates the display in a closed position.

In FIG. 1A, the display 102 is shown in a closed position i.e. in that the display covers the majority of the base 104 and that the display 102 in the closed position is the most compact configuration of the embodiment. As shown, the base includes a track 106. The display 102 includes an engagement 108 that engages the track 106. The display 102 also has a link 110 that is attached to the display 102 at an approximate midpoint location of the display 102. The link 110 can also pivot 112 in the display 102. The link 110 is attached to the base 104 at a fixed main pivot 112 in the base 104 The link 110 is attached to the display 102 is also a fixed pivoting point 114 on the display 102. The link 110 can also be a fixed length.

Each of FIGS. 1B–1G illustrates several positions 102A–G of the display 102 as the display 102 moves from a closed position 102A to an open position 102G. The several positions 102A–G illustrate movement and only one position is shown in solid lines, e.g., in FIG. 1B position 102B solid lines. The solid lined position is discussed in the corresponding illustration.

Figure 1B:
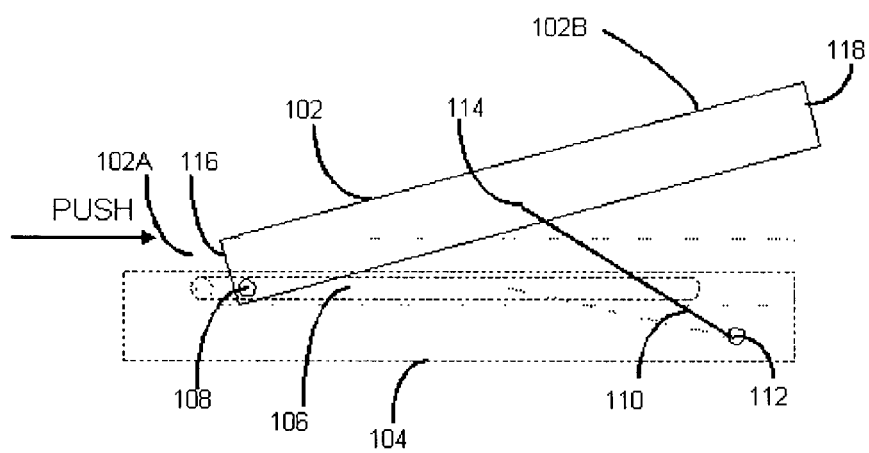
FIG. 1B shows how the display moves as pressure is applied to the forward end of the display.

FIG. 1B the display 102 moves as pressure is applied to the forward end 116 of the display 102 as shown by the push arrow. As shown, the display 102 is moved from the phantom position 102A slightly rearward in the base 102. The rear end 118 of the display 102 has risen substantially above the base 104 because the link 110 has a fixed length and has a fixed position on the display 102 and in the base 104.

In FIG. 1C, the position of the forward end 116 of the display 102 has been pushed further rearward. Previous positions 102A, 102B are also shown in phantom. In FIG. 1C, the rear end 118 of the display 102 has risen even further above the base 104. The display 102 is raised because the relationship of the engagement 108 and the main pivot 112 and the length of the link 110.

In FIG. 1D, the rear end 118 of the display 102 is further raised above the base 104. As shown, the link 110 is substantially perpendicular to the base 104. The engagement 108 is maintained in the track 106 throughout all positions 102A–G.

In FIG. 1E, the forward end 116 of the display 102 has been pressed further rearward. The link 110 has pivoted in the main pivot 112 beyond perpendicular, so that the display 102 has moved into an over center position 102E. Because the display 102 is over center, then the height of the rear end 118 of the display 102 is beginning to drop down toward the base 104. The engagement 108 is still engaged in the track 106 and therefore the forward end 116 of the display 102 has maintained a substantially constant height from the base 104.

In FIG. 1F, the rear edge 118 of the display 102 is lowered further toward a horizontal position 102G. In FIG. 1G, the display 102 is in the full open position 102G.

The embodiments described in FIGS. 1A–G allow a display or other cover 102 to open in a base 104 and yet not require slides similar to a drawer. Instead of drawer-type slides the display 102 opens in a somewhat arched path.

Figure 2:
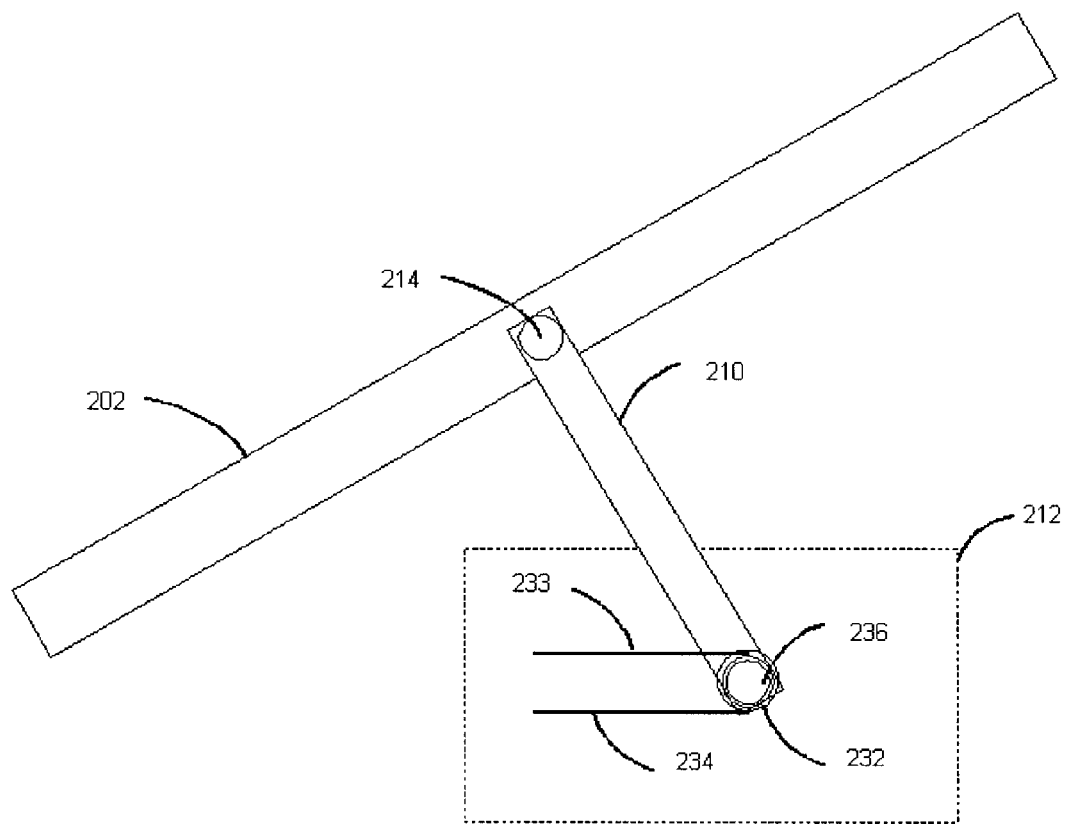
FIG. 2 illustrates one embodiment of the main pivot.

FIG. 2 illustrates one embodiment of the main pivot 212. The main pivot 212 includes a shaft or an axle 236 about which the link 210 pivots. The axle 236 can also include a tensioner 232. The tensioner 232 can provide some amount of tension to the link 210. In one embodiment, the tensioner 230 could be an open-tension tensioner. For example a tensioner 232 could be a wound spring so that tension is always applied to the link 210 that pulls the display 102 toward a full open position such as position 102G shown in FIG. 1G above.

For example, the display 202 could include a latch that secures the display 202 in the closed position (such as position 102A shown in FIG. 1A). Disengaging the latch such as by pushing the display 202 rearward, or a separate latch disengagement device, allows the tensioner 232 to draw the display 202 through intermediate positions (e.g. positions 102B–F described above) to the fully open position (e.g. position 102G described above).

In another alternative embodiment the tensioner 232 holds the display in the closed position such as position 102A described in FIG. 1A above. The tensioner 232 would therefore allow the display 202 to close more easily. The tensioner 232 could be simply reversed from the above-described opening tensioner 232. For example, a latch could hold the display 202 in the fully open position (e.g. position 102G above) and then when the latch is disengaged, the display 202 would automatically move to the closed position (e.g. position 102A described above).

Alternatively, a full open position (e.g. position 102G described above) or a full closed position (e.g. position 102A described above) may not be the ideal position for some purposes. For example, a user may wish to position the display 202 in an elevated or inclined position such as positions 102E or 102F described above. Therefore in one embodiment, détentes or other latch-type devices could be included in the main pivot 112 and/or the fixed pivoting point 114 and/or the link 110 so that the display 102 can be set to any of the positions 102A–G.

In yet another alternative embodiment, the tensioner 232 can include an "over-center" type tension. An over-center type tension provides tension toward the closed position 102A when the display 202 is in the first half of the motion from closed to open (i.e. positions 102A–C). The over-center type tension also provides tension toward the open position 102G when the display 202 is in the second half of the motion from closed to open (i.e. positions 102E–G). The over-center tension allows the display 202 to be easily held in both the open 102G and closed 102A positions without requiring additional latch devices. One embodiment of an over-center type tensioner includes a cam mounted on the shaft 236 that applies pressure against a spring arm such as 233 and/or 234 of the tensioner 232. As the link 210 rotates in the first half of the motion (i.e. positions 102A–C) the cam presses upward on the spring arm 233. At position 102D the cam is applying the maximum pressure on the spring arm 233. As the link 210 rotates through the second half of the motion (i.e. positions 102E–G), the spring arm 233 pressure on the cam causes the display 202 to move toward the full open position 102G.

Figure 3:
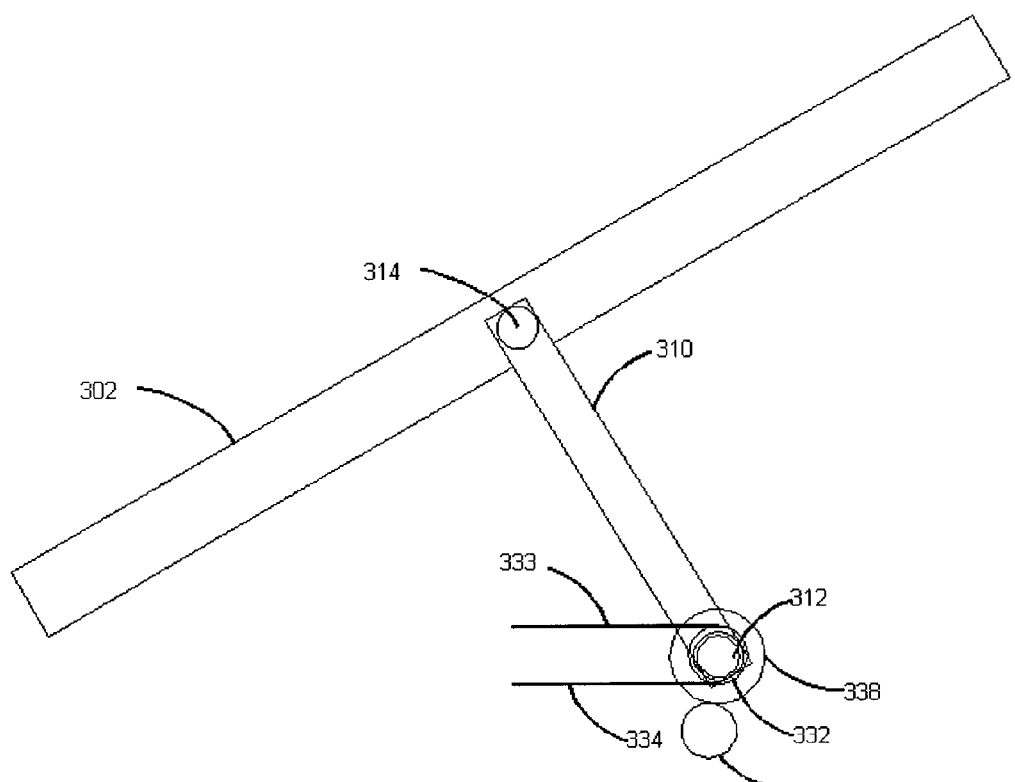
FIG. 3 illustrates one embodiment of the link and a damper.

FIG. 3 illustrates one embodiment of the link 310 and a damper 340. The damper 340 damps or slows the rotational motion of the link 310 about the main pivot 312. In one embodiment, the link 310 includes a full or partial wheel 338. The wheel 338 follows the rotation of the link 310. In one embodiment, the wheel 338 is in contact with a damper 340. The damper 340 provides resistance to rotation in either direction (i.e. open or closed directions) as the link 310 rotates in open or closed directions.

The damper 340 can be any type of damper known in the art. For example, the damper 340 may be a frictional braking device on the wheel 338 such as one or more fixed rubber (or similar frictional material) wedges or belts or drums applying friction against the wheel 338. Alternatively the damper 340 could rotate and include a resistance mechanism within the damper 340 that resists rotation. The damper 340 can be in frictional contact with the wheel 338. Alternatively the damper 340 and the wheel 338 can include intermeshing gears such that as the link 310 rotates about the main pivot 312, the wheel 338 follows the rotation of the link 310 and the wheel 338 causes the damper 340 to rotate. The resistance mechanism in the damper 340 thereby damps the movement of the link 310.

Figure 4:
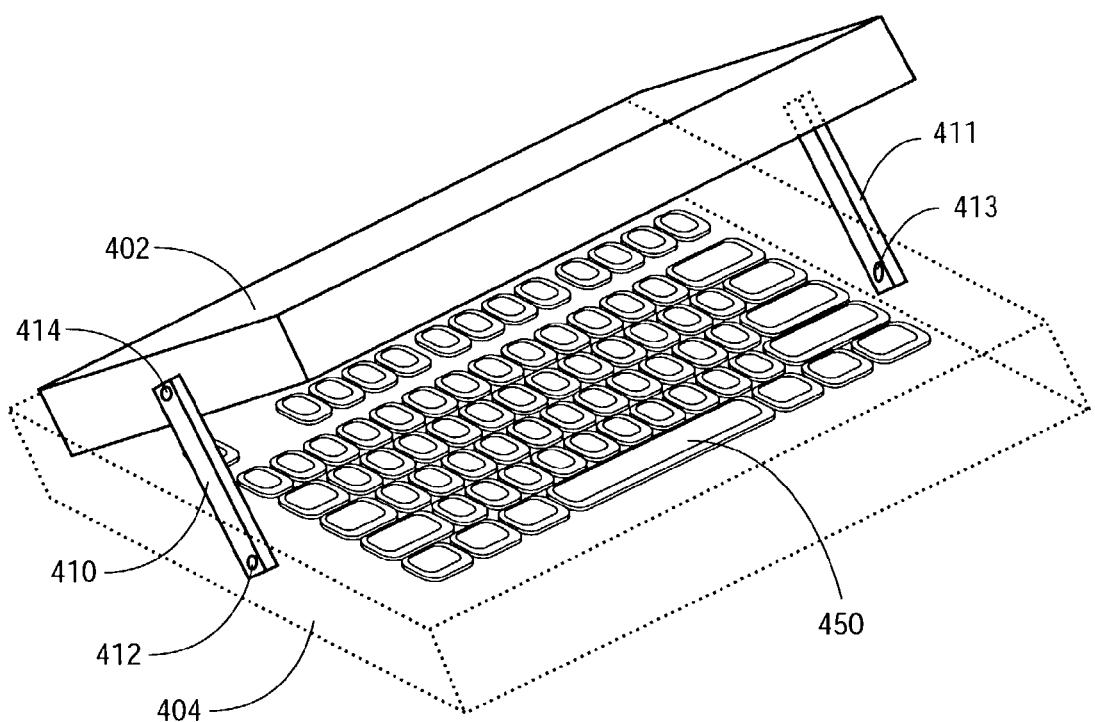
FIG. 4 illustrates one embodiment of the display or cover attached to a base with two links.

FIG. 4 illustrates one embodiment of the display or cover 402 on a base 404. The cover 402 is attached to the base 404 by two links 410, 411. The links 410, 411 are attached to the base 404 by main pivots 412, 413 respectively. The links 410, 411 are attached to the cover 402 by fixed pivots 414, 415 respectively. In one embodiment the cover 402 is also attached to the base 404 by one or more tracks and engagements such engagement 108 and track 106 as described in FIGS. 1A–G above. While two links 410, 411 are shown, additional or fewer links could also be used.

Also illustrated in FIG. 4 is a keyboard 450 disposed on the upper surface of the base 404. In this embodiment, the keyboard is covered when the display 402 is in a closed position and exposed as the display is moved to an open position, as described herein.

Figure 5:
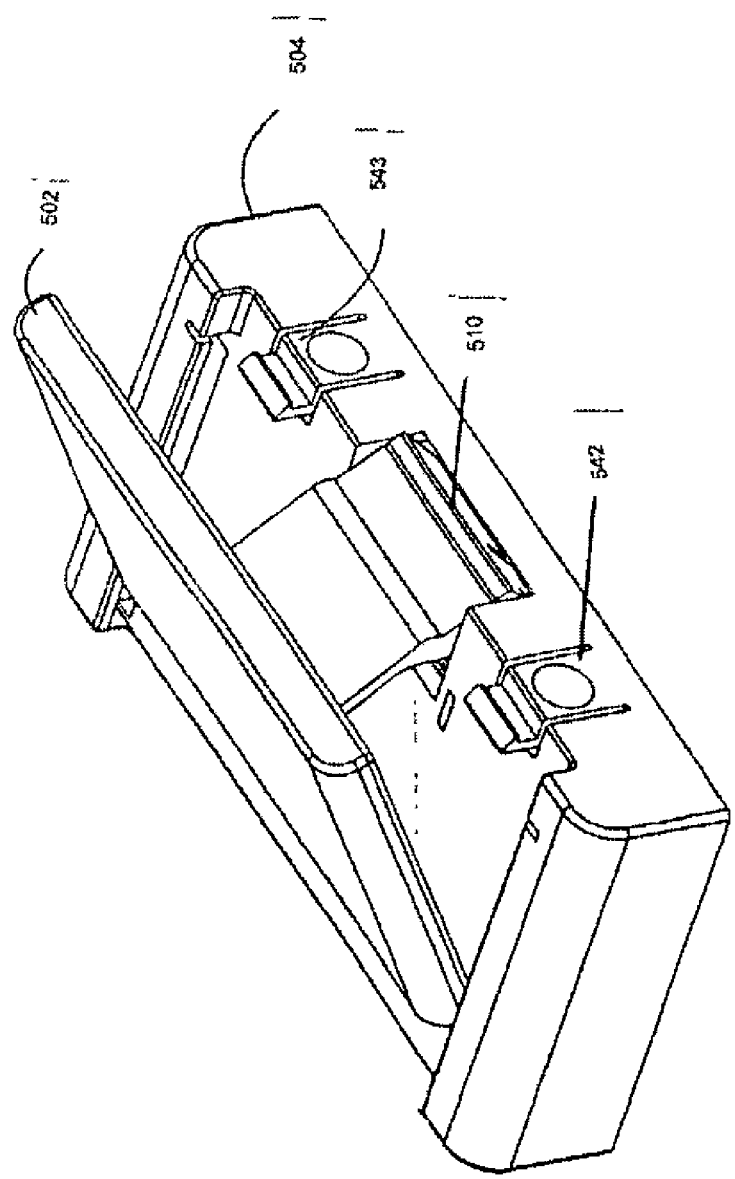
FIG. 5 illustrates one embodiment of the display or cover attached to a base with one link.

FIG. 5 illustrates one embodiment of a base 504 and a cover 502 attached to the base 504 by a single link 510. The cover 502 can include a display and can also be moveable similar to as described in FIGS. 1A–G above. As shown, the cover 502 is in a position substantially similar to position 102C described in FIG. 1C above. The link 510 is shown mounted in a substantially central location but the link can be offset to one side or the other. The base 504 also includes latches 542, 543. In one embodiment, the latches 542, 543 engage the cover 502 when the cover is in the closed position (i.e. position 102A shown in FIG. 1A above) so that the latches 542, 543 secure the cover 502 in the closed position. Alternatively the latches 542, 543 can engage the cover 502 in a full open position (i.e. position 102G shown in FIG. 1G above) so that the latches 542, 543 secure the cover 502 in the open position.

The link 510 can also include a tensioner such as the tensioner 236 described in FIG. 2 above. The link 510 can also include a damper such as the damper 340 described FIG. 3 above.

Figure 6:
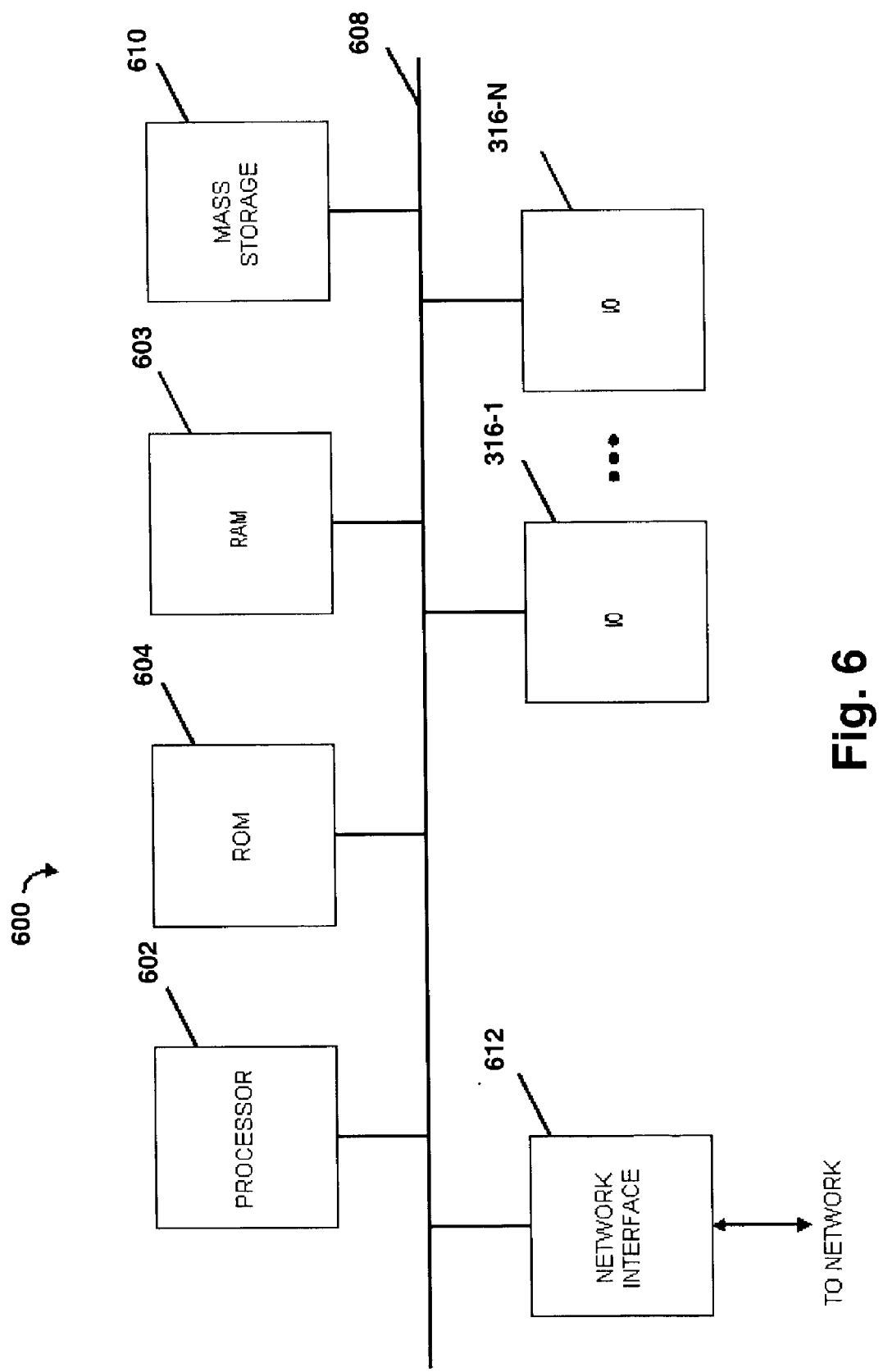
FIG. 6 shows a general computer architecture that can be used as a client or as a server computer.

FIG. 6 is a high-level block diagram of one embodiment of the processing architecture the client 701, and/or or the computers/servers with which the client communicates. As shown, the computer system 600 includes a processor 602, ROM 604, and RAM 606, each connected to a bus system 608. The bus system 608 may include one or more buses connected to each other through various bridges, controllers and/or adapters, such as are well known in the art. For example, the bus system 608 may include a "system bus" that is connected through an adapter to one or more expansion buses, such as a Peripheral Component Interconnect (PCI) bus. Also coupled to the bus system 608 are a mass storage device 610, a network interface 612, and a number (N) of input/output (I/O) devices 616-1 through 616-N.

I/O devices 616-1 through 616-N may include, for example, a keyboard, a pointing device, a display device and/or other conventional I/O devices. Mass storage device 610 may include one or more of any suitable device for storing large volumes of data, such as a magnetic disk or tape, magneto-optical (MO) storage device, or any of various types of Digital Versatile Disk (DVD) or Compact Disk (CD) based storage.

Network interface 612 provides data communication between the computer system 600 and other computer systems. Network interface 612 may be any device suitable for or enabling the computer system 600 to communicate data with a remote processing system over a data communication link, such as a conventional telephone modem, an Integrated Services Digital Network (ISDN) adapter, a Digital Subscriber Line (DSL) adapter, a cable modem, a satellite transceiver, a wireless cellular transceiver, an Ethernet adapter, or the like.

Of course, many variations upon the architecture shown in FIG. 6 can be made to suit the particular needs of a given system. Thus, certain components may be added to those shown in FIG. 6 for given system, or certain components shown in FIG. 6 may be omitted from the given system.

Figure 7:
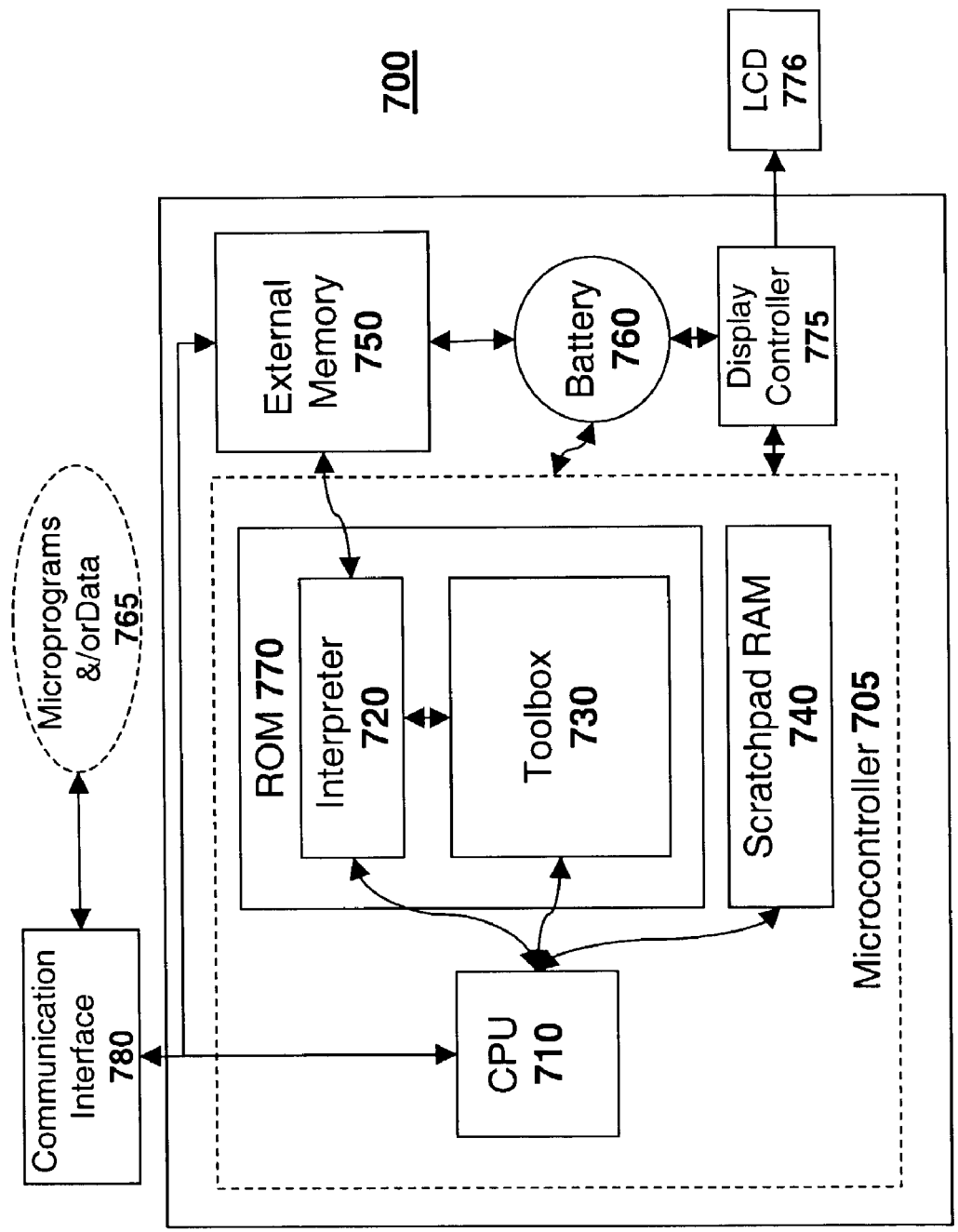
FIG. 7 shows another embodiment of a complete architecture.

FIG. 7 illustrates a more detailed embodiment of a client computing device. The client computing device may be constructed in the physical form of the cover and base combination described in FIGS. 1A–G and 2–5 above. The client computing device 700 is comprised generally of a microcontroller 705, an external memory 750, a display controller 775, and a battery 760. The external memory 750 may be used to store programs and/or data 765 transmitted to the client computing device 700 from a server 110 or other computer system. In one embodiment, the external memory 750 is non-volatile memory (e.g., an electrically erasable programmable read only memory ("EEPROM"); a programmable read only memory ("PROM"), etc). Alternatively, the memory 750 may be a volatile memory (e.g., random access memory or "RAM") but the data stored therein may be continually maintained via the battery 760. The battery 760 in one embodiment is a coin cell battery (e.g., of the same type used in portable electronic devices such as calculators and watches).

The microcontroller 705 of one embodiment is comprised of a central processing unit ("CPU") 710, a read only memory ("ROM") 770, and a scratchpad RAM 740. The ROM 770 is further comprised of an interpreter module 720 and a toolbox module 730.

The toolbox module 730 of the ROM 770 contains a set of toolbox routines for processing data, text and graphics on the client computing device 700. These routines include drawing text and graphics on the client computing device's display, decompressing data transmitted from the server, reproducing audio on the client computing device 700, and performing various input/output and communication functions. A variety of additional client computing device functions may be included within the toolbox 730 while still complying with the underlying principles of the invention.

In one embodiment, microprograms and data 760 are transmitted from the server to the external memory 750 of the client computing device via a communication interface 780 under control of the CPU 710. Various communication interfaces 780 may be employed without departing from the underlying principles of the invention including, for example, a Universal Serial Bus ("USB") interface or a serial communication ("serial") interface. The communication device 780 may also include any other similar RF receiver/transmitter combination that will allow the microcontroller 705 to establish a link to a server. For example, in one particular embodiment, the client computing device 700 transmits and receives data to/from a cellular network via the general packet radio service ("GPRS"). As it is known in the art, the GPRS standard is a digital wireless packet switched standard. Embodiments of the client computing device may also be configured to transmit/receive data using a variety of other communication standards including 2-way paging standards and third generation ("3G") wireless standards (e.g., UTMS, CDMA 2000, NTT DoCoMo, . . . etc).

The microprograms in one embodiment are comprised of compact, interpreted instructions known as "bytecodes," which are converted into native code by the interpreter module 720 before being executed by the CPU 710. One of the benefits of this configuration is that when the microcontroller/CPU portion of the client computing device 700 is upgraded (e.g., to a faster and/or less expensive model), only the interpreter module 720 and toolbox 730 of the ROM needs to be rewritten to interpret the currently existing bytecodes for the new microcontroller/CPU. In addition, this configuration allows client computing devices 700 with different CPUs to coexist and execute the same microprograms. Moreover, programming frequently-used routines in the ROM toolbox module 730 reduces the size of microprograms stored in the external memory 750, thereby conserving memory and bandwidth. In one embodiment, new interpreter modules 720 and/or toolbox routines 730 may be developed to execute the same microprograms on cellular phones, personal information managers ("PIMs"), or any other device with a CPU and memory.

One embodiment of the ROM 770 may be comprised of interpreted code as well as native code written specifically for the microcontroller CPU 705. More particularly, some toolbox routines may be written as interpreted code (as indicated by the arrow between the toolbox 730 and the interpreter module 720) to conserve memory and bandwidth for the same reasons described above with respect to microprograms. Moreover, in one embodiment, data and microprograms stored in external memory 750 may be configured to override older versions of data/microprograms stored in the ROM 770 (e.g., in the ROM toolbox 730).

In one embodiment of the client computing device 700, the CPU 705 employs a 32-bit RISC-based microprocessor such as an ARM processor. As is known in the art, ARM processors are widely used in PDAs, cell phones and a variety of other wireless devices. It should be noted, however, that various other hardware and software (and/or firmware) architectures may be used for the client computing device 700 while still complying with the underlying principles of the invention.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A sliding display apparatus comprising:
    a base having a keyboard; and
    a cover including a display;
    wherein the cover substantially covers the base in a closed position and uncovers the keyboard when moved from the closed position to an open position;
    wherein the cover in a closed position uncovers the keyboard upon a pressure being applied to an edge of the cover;
    wherein the cover and the base are substantially parallel in the closed position and the open position;
    wherein a first edge of the cover is slideably coupled to the base;
    wherein the cover is further coupled to the base by one or more links;
    wherein each one of the one or more links have a first pivot in a first axis and a second pivot in a second axis;
    wherein the first axis, the second axis and the first edge of the cover are substantially parallel;
    wherein the first axis is substantially located in the base;
    wherein the location of the first axis in the base is substantially fixed in the base;
    wherein the second axis is located in the cover;
    wherein the second axis is located at an approximate midpoint location of the cover;
    wherein the first pivot includes a tensioner;
    wherein the tensioner applies tension to the first pivot of each of the one or more links;
    wherein the tensioner holds the cover in the open position or the closed position;
    wherein the tensioner includes a damper; and
    wherein the display is visible in both the closed position and the open position.

2. The apparatus of claim 1 wherein slideably coupled includes at least one track and at least one track engagement in each of the at least one track.

3. The apparatus of claim 2 wherein the at least one track is substantially located in the base and wherein the at least one track engagement is attached to the cover.

4. The apparatus of claim 1 wherein the base includes a first track side and a second track side wherein the first track side extends above base to the substantially overlap a first side of the cover and wherein the second track side extends above the bottom surface of the base to substantially overlap a second side of the cover and wherein the first and second sides of the cover are opposing sides of the cover.

5. The apparatus of claim 4 wherein slideably coupled includes a first track located in the first track side and a second track located in the second track side and wherein an open side of the first track opens toward the first side of the cover and wherein the an open side of the second track opens toward the second side of the cover and wherein a first engagement is attached to the first side of the cover located proximal to the first edge of the cover and wherein the first engagement slideably engages the first track and wherein a second engagement is attached to the second side of the cover located proximal to the first edge of the cover and wherein the second engagement slideably engages the second track.

6. The apparatus of claim 1 wherein the base further includes a computer.

7. The apparatus of claim 6 wherein the computer includes a wireless network device.

8. The apparatus of claim 7 wherein the wireless network device includes a receiver-transmitter.

9. The apparatus of claim 7 wherein the wireless network device includes a cellular telephone receiver transmitter.

10. The apparatus of claim 7 wherein the wireless network device includes a cellular telephone.

11. The apparatus of claim 1 wherein the tension on the first pivot is reduced as the cover is moved from the closed position to an open position.

12. The apparatus of claim 1 wherein the tension on the first pivot is increased as the cover is moved from the closed position to a center position and wherein the tension on the first pivot is reduced as the cover is moved from the center position to a open position.

13. The apparatus of claim 1 wherein the damper is a rotary damper.

14. The apparatus of claim 1 wherein the tensioner includes a spring.

15. The apparatus of claim 14 wherein the spring is a torsional spring.

16. The apparatus of claim 1 wherein the base includes at least one latch and wherein the at least one latch engages the cover in the closed position.

17. A portable data processing apparatus comprising:
    a base including a keyboard;
    a cover having a first edge slideably coupled to the base and a second edge opposite the first edge, the cover substantially covers the base in a first position and uncovers the keyboard when moved from the first position to a second position, wherein:
        the cover in a first position uncovers the keyboard upon a pressure being applied to an edge of the cover; and
        the cover and the base are substantially parallel in a first position and a second position;
    at least one linkage rotatably coupled to the approximate midpoint location of the cover at a first rotation point and rotatably coupled to the base at a second rotation point, the linkage allowing relative rotational movement between the cover and the base;
    a tensioner coupled to the first and/or second rotation point, the tensioner configured to apply a force to direct the cover towards a first position or a second position, wherein the tensioner includes a damper;
    wherein, when the cover is in the first position, a line connecting the first rotation point with the second rotation point forms an angle of less than ninety degrees with respect to a plane defined by the base and wherein, as the cover is moved from the first position to the second position, the angle between the line and the plane defined by the base increases to substantially ninety degrees prior to the cover reaching the second position and wherein, when the cover reaches the second position, the angle between the line and the plane defined by the base is greater than ninety degrees; and wherein a display on the cover is viewable in both the first position and the second position.

18. The portable data processing apparatus as in claim 17 wherein the first edge of the cover includes a track engagement slideably coupled to at least one track formed on the base.

19. The apparatus as in claim 17 further comprising a latch formed on the display to engage the display with the base and hold the display in place when the display is in the second position.

20. The apparatus as in claim 17 further comprising a latch formed on the display to engage the display with the base and hold the display in place when the display is in the first position.

21. The apparatus as in claim 17 wherein the tensioner applies a force to direct the cover towards the first position when the cover is relatively closer to the first position than the second position and applies a force to direct the cover towards the second position when the cover is relatively closer to the second position than the first position.

* * * * *